(12) United States Patent
Mazur (10) Patent No.: US 8,513,826 B2
(45) Date of Patent: Aug. 20, 2013

(54) WIND TURBINE

(76) Inventor: Ed Mazur, Sierra Vista, AZ (US)

( * ) Notice: Subject to any disclaimer, the term of this patent is extended or adjusted under 35 U.S.C. 154(b) by 539 days.

(21) Appl. No.: 12/215,233

(22) Filed: Jun. 26, 2008

(65) Prior Publication Data

US 2009/0322095 A1 Dec. 31, 2009

(51) Int. Cl.
| | |
|---|---|
| *F03D 9/00* | (2006.01) |
| *H02P 9/04* | (2006.01) |
| *B64C 11/00* | (2006.01) |
| *B64C 27/00* | (2006.01) |
| *H02K 7/09* | (2006.01) |

(52) U.S. Cl.
USPC ............. 290/44; 290/55; 416/1; 417/423.4; 310/90.5

(58) Field of Classification Search
USPC ..... 290/44, 55; 416/1; 310/90.5; 417/423.4
See application file for complete search history.

(56) References Cited

U.S. PATENT DOCUMENTS

| | | | | |
|---|---|---|---|---|
| 2,243,555 A | * | 5/1941 | Faus | 310/103 |
| 2,358,704 A | * | 9/1944 | Goudy | 52/236.1 |
| 3,125,189 A | * | 3/1964 | Graham | 52/65 |
| 3,156,017 A | * | 11/1964 | Faerber | 52/65 |
| 3,382,386 A | * | 5/1968 | Schlaeppi | 310/104 |
| 3,633,904 A | * | 1/1972 | Kojima | 472/2 |
| 4,320,927 A | * | 3/1982 | Sertich | 310/90.5 |
| 4,340,260 A | * | 7/1982 | Forster et al. | 310/90.5 |
| 4,650,132 A | * | 3/1987 | Graf et al. | 242/484.6 |
| 4,979,871 A | * | 12/1990 | Reiner | 415/4.2 |
| 5,072,146 A | * | 12/1991 | New | 310/90.5 |
| 5,112,202 A | * | 5/1992 | Oshima et al. | 417/423.7 |
| 5,152,679 A | * | 10/1992 | Kanemitsu et al. | 417/423.4 |
| 5,171,127 A | * | 12/1992 | Feldman et al. | 416/119 |
| 5,183,386 A | * | 2/1993 | Feldman et al. | 416/119 |
| 5,314,868 A | * | 5/1994 | Takahata et al. | 505/166 |
| 5,396,741 A | * | 3/1995 | Adlam | 52/40 |
| 5,530,306 A | * | 6/1996 | Ueyama | 310/90.5 |
| 5,542,825 A | * | 8/1996 | Perrillat-Amede et al. | 417/423.4 |
| 5,562,528 A | * | 10/1996 | Ueyama et al. | 451/11 |
| 5,664,418 A | * | 9/1997 | Walters | 60/398 |
| 5,679,992 A | * | 10/1997 | Miyamoto et al. | 310/90.5 |
| 5,729,066 A | * | 3/1998 | Soong et al. | 310/90.5 |
| 5,739,609 A | * | 4/1998 | Ueyama et al. | 310/90.5 |

(Continued)

FOREIGN PATENT DOCUMENTS

| | | |
|---|---|---|
| DE | 3436810 A1 | 4/1985 |
| DE | 29907289 U1 | 8/1999 |

(Continued)

OTHER PUBLICATIONS

Jeremy Faludi, Frictionless Windmills from China?, Jul. 23, 2006, available at http://www.worldchanging.com/archives/004708.html.

(Continued)

*Primary Examiner* — Pedro J Cuevas
(74) *Attorney, Agent, or Firm* — Raymond Van Dyke; Van Dyke Law (57) ABSTRACT

A wind turbine having one or more sets of opposing magnets to create an opposing force between a turbine support and a turbine rotor great enough to form a space between them thereby reducing friction between the turbine support and the turbine rotor. The reduction of friction between the turbine rotor and the turbine support allows for an increase in energy production and scale of the wind turbines.

20 Claims, 5 Drawing Sheets

(56) References Cited

U.S. PATENT DOCUMENTS

| | | | |
|---|---|---|---|
| 5,772,564 A * | 6/1998 | Taniguchi et al. | 483/7 |
| 5,783,294 A | 7/1998 | Hiraiwa et al. | 428/215 |
| 5,783,887 A * | 7/1998 | Ueyama et al. | 310/90.5 |
| 5,804,900 A * | 9/1998 | Taniguchi et al. | 310/90.5 |
| 6,047,456 A * | 4/2000 | Yao et al. | 29/407.05 |
| 6,519,273 B2 | 2/2003 | Sekiguchi et al. | 372/58 |
| 6,570,286 B1 * | 5/2003 | Gabrys | 310/90.5 |
| 6,617,734 B2 * | 9/2003 | Taniguchi et al. | 310/90.5 |
| 6,653,756 B2 * | 11/2003 | Ueyama et al. | 310/90.5 |
| 6,664,680 B1 * | 12/2003 | Gabrys | 310/74 |
| 6,710,489 B1 * | 3/2004 | Gabrys | 310/90.5 |
| 6,727,616 B1 * | 4/2004 | Gabrys et al. | 310/90.5 |
| 6,784,564 B1 | 8/2004 | Wobben | 290/44 |
| 6,806,605 B1 * | 10/2004 | Gabrys | 310/90.5 |
| 6,808,366 B2 * | 10/2004 | Sikes | 416/1 |
| 6,831,374 B2 * | 12/2004 | Seki | 290/44 |
| 6,984,899 B1 | 1/2006 | Rice | 290/44 |
| 6,984,907 B2 * | 1/2006 | Barada | 310/90.5 |
| 6,998,729 B1 * | 2/2006 | Wobben | 290/54 |
| 7,042,109 B2 | 5/2006 | Gabrys | 290/44 |
| 7,056,082 B1 | 6/2006 | Taylor | 415/4.2 |
| 7,098,553 B2 * | 8/2006 | Wiegel et al. | 290/55 |
| 7,105,968 B2 * | 9/2006 | Nissen | 310/103 |
| 7,156,627 B2 * | 1/2007 | Lenderink et al. | 417/423.8 |
| 7,210,882 B2 * | 5/2007 | Andersen e | 410/42 |
| 7,218,011 B2 * | 5/2007 | Hiel et al. | 290/43 |
| 7,230,348 B2 * | 6/2007 | Poole | 290/55 |
| 7,234,409 B2 * | 6/2007 | Hansen | 114/258 |
| 7,303,369 B2 | 12/2007 | Rowan et al. | 415/4.2 |
| 7,329,965 B2 * | 2/2008 | Roberts et al. | 415/4.2 |
| 7,344,353 B2 | 3/2008 | Naskali et al. | 415/4.2 |
| 7,355,833 B2 * | 4/2008 | Kozaki | 361/139 |
| 7,416,525 B2 * | 8/2008 | Wampler et al. | 600/16 |
| 7,431,688 B2 * | 10/2008 | Wampler et al. | 600/16 |
| 7,436,093 B2 * | 10/2008 | Brunet | 310/90.5 |
| 7,462,950 B2 * | 12/2008 | Hu | 290/55 |
| 7,466,051 B2 * | 12/2008 | Miya et al. | 310/90.5 |
| 7,525,784 B2 * | 4/2009 | Kozaki | 361/139 |
| 7,576,463 B2 * | 8/2009 | Kubo | 310/90.5 |
| 7,635,937 B2 * | 12/2009 | Brunet et al. | 310/90.5 |
| 7,666,062 B2 * | 2/2010 | Kubo | 451/5 |
| 7,682,301 B2 * | 3/2010 | Wampler et al. | 600/16 |
| 7,753,645 B2 * | 7/2010 | Wampler et al. | 415/104 |
| 7,794,205 B1 * | 9/2010 | Lowe-Wylde | 416/1 |
| 7,802,966 B2 * | 9/2010 | Wampler et al. | 415/201 |
| 7,821,168 B2 * | 10/2010 | Halstead | 310/156.32 |
| 7,893,555 B2 * | 2/2011 | Casazza et al. | 290/55 |
| 8,217,526 B2 * | 7/2012 | Devitt | 290/55 |
| 8,258,647 B2 * | 9/2012 | Haar | 290/44 |
| 2002/0047399 A1 * | 4/2002 | Shinozaki | 310/90.5 |
| 2002/0047400 A1 * | 4/2002 | Ueyama et al. | 310/90.5 |
| 2003/0107282 A1 * | 6/2003 | Ooyama et al. | 310/90.5 |
| 2003/0107283 A1 * | 6/2003 | Suzuki et al. | 310/90.5 |
| 2003/0141772 A1 * | 7/2003 | Abel | 310/90.5 |
| 2004/0047732 A1 * | 3/2004 | Sikes | 416/1 |
| 2004/0170505 A1 * | 9/2004 | Lenderink et al. | 417/244 |
| 2004/0262926 A1 * | 12/2004 | Hansen | 290/44 |
| 2005/0002783 A1 * | 1/2005 | Hiel et al. | 415/208.1 |
| 2005/0084398 A1 * | 4/2005 | Wampler et al. | 417/423.7 |
| 2005/0084399 A1 * | 4/2005 | Wampler et al. | 417/423.12 |
| 2005/0095151 A1 * | 5/2005 | Wampler et al. | 417/423.12 |
| 2006/0119201 A1 * | 6/2006 | Nissen | 310/103 |
| 2006/0152012 A1 * | 7/2006 | Wiegel et al. | 290/55 |
| 2006/0153672 A1 | 7/2006 | Davis | 415/4.2 |
| 2006/0275105 A1 * | 12/2006 | Roberts et al. | 415/4.2 |
| 2006/0279149 A1 * | 12/2006 | Asper | 310/90.5 |
| 2007/0069598 A1 * | 3/2007 | Kozaki | 310/90.5 |
| 2007/0098563 A1 | 5/2007 | Rowan et al. | 416/244 R |
| 2007/0110601 A1 * | 5/2007 | Lenderink et al. | 417/423.12 |
| 2007/0120432 A1 * | 5/2007 | Vaden et al. | 310/80 |
| 2007/0132327 A1 * | 6/2007 | Brunet | 310/90.5 |
| 2007/0164627 A1 * | 7/2007 | Brunet et al. | 310/90.5 |
| 2007/0210659 A1 * | 9/2007 | Long | 310/80 |
| 2007/0231118 A1 | 10/2007 | Krippene | 415/4.2 |
| 2008/0054741 A1 * | 3/2008 | Oyama | 310/68 A |
| 2008/0074010 A1 * | 3/2008 | Jungmayr et al. | 310/67 R |
| 2008/0080983 A1 * | 4/2008 | Wampler et al. | 417/48 |
| 2008/0085184 A1 * | 4/2008 | Wampler et al. | 415/170.1 |
| 2008/0089779 A1 * | 4/2008 | Wampler et al. | 415/104 |
| 2008/0089797 A1 * | 4/2008 | Wampler et al. | 417/420 |
| 2008/0095648 A1 * | 4/2008 | Wampler et al. | 417/423.7 |
| 2008/0145224 A1 * | 6/2008 | Mitchell et al. | 416/132 B |
| 2008/0174119 A1 * | 7/2008 | Hu | 290/55 |
| 2008/0206079 A1 * | 8/2008 | Okuda et al. | 417/423.4 |
| 2008/0233851 A1 * | 9/2008 | Kubo | 451/541 |
| 2008/0246358 A1 * | 10/2008 | Kubo | 310/90.5 |
| 2008/0252161 A1 * | 10/2008 | Kubo | 310/90.5 |
| 2008/0292469 A1 * | 11/2008 | Taniguchi et al. | 417/14 |
| 2008/0310963 A1 * | 12/2008 | Wampler et al. | 416/223 R |
| 2008/0317398 A1 * | 12/2008 | Ishigami | 384/448 |
| 2009/0009018 A1 * | 1/2009 | Kameno | 310/90.5 |
| 2009/0035134 A1 * | 2/2009 | Kuo et al. | 416/119 |
| 2009/0042479 A1 * | 2/2009 | Kameno et al. | 451/5 |
| 2009/0079161 A1 * | 3/2009 | Muchow et al. | 280/400 |
| 2009/0191057 A1 * | 7/2009 | Knutson | 416/23 |
| 2009/0200883 A1 * | 8/2009 | Halstead | 310/90.5 |
| 2009/0324383 A1 * | 12/2009 | Mazur | 415/4.2 |
| 2010/0111689 A1 * | 5/2010 | Davis | 415/229 |
| 2010/0133838 A1 * | 6/2010 | Borgen | 290/52 |
| 2010/0133851 A1 * | 6/2010 | Devitt | 290/55 |
| 2010/0135832 A1 * | 6/2010 | Wampler et al. | 417/423.1 |
| 2010/0232984 A1 * | 9/2010 | Bade et al. | 417/53 |
| 2010/0295316 A1 * | 11/2010 | Grassman | 290/55 |
| 2011/0133474 A1 * | 6/2011 | Haar | 290/55 |
| 2011/0260455 A1 * | 10/2011 | Haar | 290/44 |
| 2012/0148403 A1 * | 6/2012 | Flaherty et al. | 416/1 |
| 2012/0272509 A1 * | 11/2012 | Devitt | 29/527.2 |

FOREIGN PATENT DOCUMENTS

| | | |
|---|---|---|
| DE | 29907289 U1 | 9/1999 |
| EP | 1096144 A2 | 5/2001 |
| KR | 20090084549 A | 8/2009 |
| KR | 20090084551 A | 8/2009 |
| KR | 20090092419 A | 9/2009 |
| KR | 20090120160 A | 11/2009 |
| WO | 0123757 A1 | 4/2001 |
| WO | 2007061150 A1 | 5/2007 |
| WO | 2008046272 A1 | 4/2008 |
| WO | PCT/US2008/009801 | 3/2009 |
| WO | PCT/US2008/009803 | 3/2009 |
| WO | 2009096739 | 8/2009 |

OTHER PUBLICATIONS

Aleksandr Nagorny, High Speed Permanent Magnet Synchronous Motor / Generator Design for Flywheel Applications, Glenn Research Center, United Kingdom.

F.N. Werfel, et al., Flywheel Energy Storage System (FESS) with HTS Magnetic Bearings, Adelwitz Technologiezentrum GmbH (ATZ), Germany.

I.J. Inglesias, et al., Flywheel Switched Reluctance Motor Drive for Wind Energy Applications, Centro de Estudios y Experimentacion de Obras Publicas (Cedex), Madrid.

* cited by examiner

WIND TURBINE

FIELD OF INVENTION

The field of invention relates to a wind turbine having one or more sets of magnets for reducing friction between a turbine rotor and a turbine support.

RELATED PATENT APPLICATIONS

The present application, Mazur, Wind Turbine is co-pending with the simultaneously filed patent application, Mazur, Wind Compressor.

BACKGROUND OF THE INVENTION

Wind turbines harness the kinetic energy of the wind and convert it into mechanical or electric power. Traditional wind turbines have a horizontal spinning axis that allowed blades of the wind turbine to rotate around the axis. As wind engages the blades, the blades move around the horizontal spinning axis of the wind turbine. The relative rotation of the blades to the horizontal axis may then be converted into energy.

Recently vertical axis wind turbines have been used to harness the kinetic energy of the wind. Vertical axis wind turbines operate in the same manner as horizontal axis wind turbines; however, the axis is a vertical plane and the blades spin around the vertical axis. During the operation of the horizontal axis and vertical axis wind turbines, energy is lost during the process as the mechanical pieces of the windmill lose energy to friction forces. Further, the friction between the moving parts create maintenance problems which require frequent and costly repairs.

SUMMARY

The present invention increases the efficiency of a wind turbine because the friction occurring between the parts of a wind turbine is significantly reduced. The wind turbine of this invention comprise a turbine rotor, a turbine support, one or more blades coupled to the turbine rotor, the one or more blades configured to move the turbine rotor relative to the turbine support. The significant improvement in efficiency is attributed to one or more magnet sets located between the turbine support and the turbine rotor. The one or more magnet sets create a space between at least a portion of the turbine rotor and a portion of the turbine support. Alternatively, the space created by the magnet is between the entire turbine rotor and the entire turbine support. The rotational movement of the turbine rotor is essentially frictionless and minimal energy is expended during rotation of the turbine blades. The energy output produced by the turbine rotor is transmitted to one or more generators that are configured to generate electric power from the rotational movement of the turbine rotor.

In one embodiment of this invention, a wind turbine comprises a vertical turbine rotor for rotating around a core axis, the turbine rotor comprising a central axis. A vertical turbine support lies within and concentric to the turbine support for rotating in relation to the turbine rotor, the turbine support comprising a support shaft. The support shaft is positioned radially inside the central axis. One or more blades are coupled to the turbine rotor, the one or more blades configured to increase wind energy by rotating the turbine rotor relative to the turbine support. Advantageously, one or more sets of magnets positioned on a side of the turbine support adjacent the turbine rotor and one or more sets of magnets are positioned on a side of the central axis adjacent the turbine support. The turbine support magnets create an opposing force to the turbine rotor magnets.

In another aspect of this invention, a space is defined between at least a portion of the turbine rotor and a portion of the turbine support, wherein the space is created by the opposing forces of the one or more magnet sets. The space helps to reduce the friction between the rotating turbine rotor and the turbine support. One or more generators are configured to generate electric power in response to the movement of the turbine rotor relative to the turbine support.

In one aspect of this invention, the turbine support further comprises a support shaft and a base. The base further comprises a platform located substantially under a bottom of the turbine rotor. One or more magnet sets further comprise one or more levitation magnet sets, wherein the one or more levitation magnet sets are configured to form the space between the platform of the turbine support and the bottom of the turbine rotor. Alternatively the one or more magnet sets can comprise one or more stabilization magnet sets. The one or more stabilization magnet sets are configured to form the space between the support shaft and the turbine rotor.

The one or more generators have a generator gear; and a turbine gear, wherein the turbine gear is configured to move the generator gear. To further improve efficiency of the wind turbine, a magnetic gear connection is present between the generator gear and the turbine gear. The magnetic gear connection is configured to move the generator gear with reduced friction between the turbine gear and the generator gear. The one or more generators can comprise at least one linear synchronous generator.

The turbine rotor comprises a central axis, a bottom; and a top. In one embodiment of this invention, the bottom and the top extend substantially radially away from the central axis. One or more blades may comprise a poly-carbon material and extend substantially between the top and the bottom of the turbine rotor.

In an alternative embodiment of a wind turbine, the wind turbine comprises a turbine rotor, a turbine support; and one or more blades coupled to the turbine rotor, the one or more blades configured to move the turbine rotor relative to the turbine support in response to wind engaging and rotating the one or more blades. This embodiment of the wind turbine also comprises one or more magnet sets located between the turbine support and the turbine rotor, the one or more magnets positioned on the turbine support and/or the turbine rotor to create a space between the turbine support and the turbine rotor thereby reducing friction between the turbine support and the turbine rotor. One or more generators are configured to generate electric power in response to the relative rotational movement between the turbine rotor and the turbine support frame. The turbine support frame further comprises a base located below the turbine rotor, a support shaft located along a central axis of the turbine rotor and a top configured to cover a substantial portion of the turbine rotor and the one or more blades. Advantageously, the wind turbine of this embodiment has a top that further comprises an observation deck for one or more persons to access. The support shaft has an interior access way configured to allow the one or more persons to travel to and from the observation deck. The interior access way can comprises an elevator for easy access.

In one embodiment, the wind turbine may have a transport device located beneath the turbine support and configured to move the wind turbine to and from remote sites. The transport device may comprise a trailer.

In a method for generating electricity, advantageously, the method comprises lifting a vertical turbine rotor off of a turbine support using one or more sets of magnets thereby reducing the friction between the vertical turbine rotor and the turbine support. As one or more blades coupled to the vertical turbine rotor engage with wind, the vertical turbine rotor rotates relative to the turbine support and the mechanical energy of the moving vertical turbine rotor is converted into electric power using a generator. The one or more sets of magnets are used to create a space between the vertical turbine rotor and the turbine support. In this method, the turbine support further comprises a support shaft and a base, the base further comprising a platform located substantially under a bottom of the turbine rotor and the method further comprises using one or more levitation magnet sets positioned on the platform adjacent the bottom of the turbine rotor and one or more levitation magnet sets positioned on the bottom of the turbine rotor adjacent to the platform, wherein the one or more levitation magnet sets on the platform and the one or more levitation magnet sets on the bottom of the turbine rotor create an opposing force resulting in a space between the turbine rotor and the turbine support.

A turbine gear is mechanically coupled to the vertical turbine rotor that is proximate a generator gear and mechanically coupled to the generator. The rotation of the turbine gear is transmitted to the generator gear causing the generator gear to rotate. Rotating the generator gear further comprises engaging the generator gear with a magnetic force between the turbine gear and the generator gear.

In an alternative method for generating electricity, a set of dipolar magnets is coupled to a turbine rotor and a turbine support. The set of dipolar magnets is used to create a space between the turbine rotor and turbine support thereby reducing the friction force between the turbine rotor and the turbine support. In this way, the mechanical energy of the moving turbine rotor is converted into electric power using a generator with greater efficiency resulting in a significant increase in electrical power by each wind turbine.

DETAILED DESCRIPTION

Figure 1A:
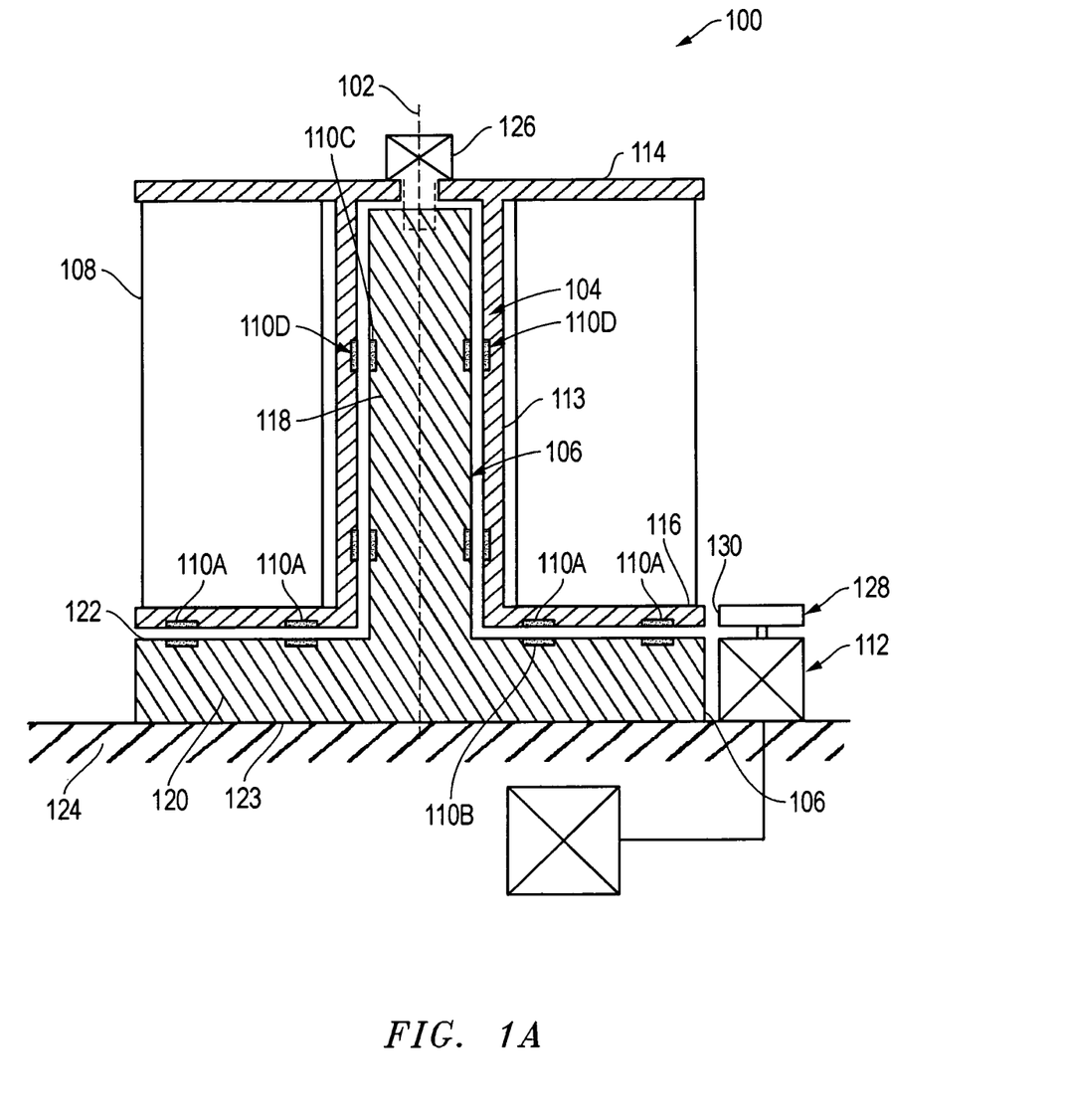
FIG. 1A is a schematic cross-sectional view of a wind turbine according to one embodiment.

FIG. 1A is a schematic cross sectional view of a wind turbine 100, according to one embodiment. The wind turbine 100, as shown, is a vertical axis wind turbine. Therefore, a core axis 102 of the wind turbine 100 is substantially in a vertical plane relative to the Earth. The wind turbine 100 may have a turbine rotor 104 and a turbine support 106 within and concentric to the turbine rotor 104. The turbine rotor 104 rotates around the core axis 102 of the turbine support 106 in response to wind engaging one or more blades 108, shown schematically. The kinetic energy from the wind is captured by the blades 108 thereby rotating the turbine rotor 104. The turbine core support 106 may remain stationary as the turbine rotor 104 rotates around the axis 102. In order to reduce the effects of friction between the rotating turbine rotor 104 and the turbine support 106, one or more sets of magnets 110 are used to reduce the weight force of the turbine rotor 104 acting on the turbine support 106. A generator 112 may be located proximate the wind turbine 100 in order to convert the mechanical energy of the rotating turbine rotor 104 into electric power.

Figure 1B:
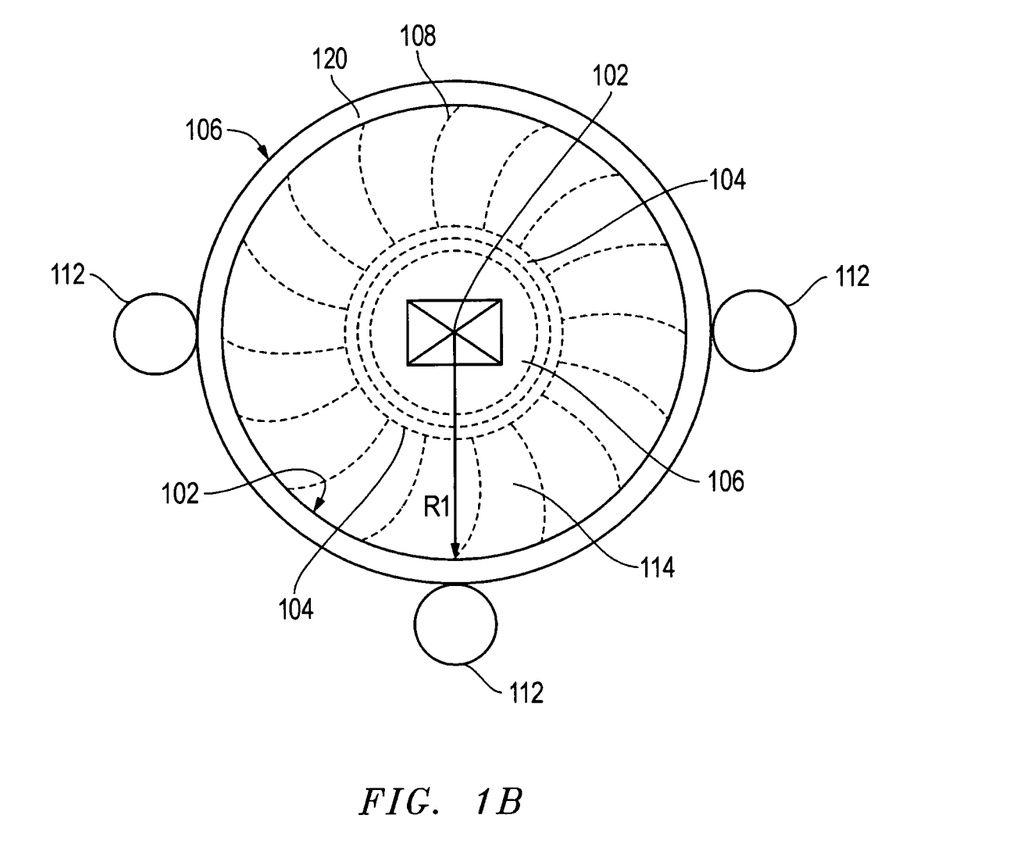
FIG. 1B is a schematic top view of a wind turbine according to one embodiment.

The turbine rotor 104, as shown in FIG. 1A, comprises a central axis 113 that is substantially centered around the axis 102. The turbine rotor 104, may include a top 114 and a bottom 116 extending out from the central axis 113. As shown, the central axis 113 supports the top 114 and the bottom 116. The top 114 and/or the bottom 116, as shown, extends radially away from the central axis 113. In FIG. 1B a top view of the wind turbine 100 is shown. The top view shows the top 114 extending a first radius R1 away from the axis 102. The bottom 116 may extend the same distance as the top 114 from the axis 102; however, it should be appreciated that the distance the top 114 and bottom 116 extend from the axis 102 may vary depending on design conditions. The top 114, as shown in FIGS. 1A and 1B, extends over the top of a support shaft 118 of the turbine support 106; however, it should be appreciated that other suitable configurations for the top 114 may be used.

Figure 2:
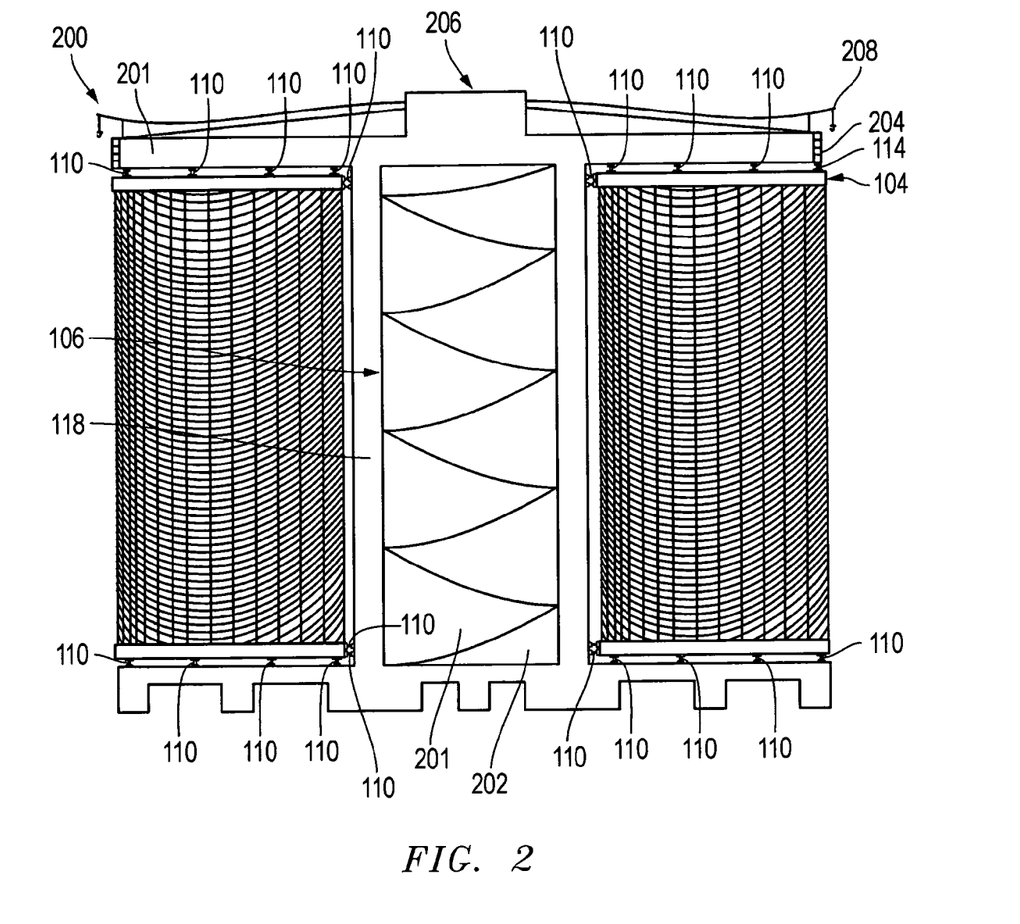
FIG. 2 is a schematic cross-sectional view of a wind turbine according to one embodiment.

The turbine rotor 104 may have alternative designs to the one shown in FIG. 1. For example, the turbine rotor 104 may not cover the top of the support shaft 118, as shown in FIG. 2. Further, the turbine rotor 104 may simply include the top 114 and the bottom 116 and be held together by the blades 108. Further still, the top 114 and/or the bottom 116 may not be shaped in a circular pattern, but instead may extend as supports over each of the blades 108 in an effort to save money on materials and reduce the weight of the turbine rotor 104. The turbine rotor 104 may have any suitable design capable of supporting the blades 108 and rotating around the axis 102.

The bottom 116 of the turbine rotor 104 may include one or more of the magnets 110. The one or more magnets 110 located in the bottom 116 of the turbine rotor 104 provide an opposing force against one or more magnets 110 located on the turbine support 106. The opposing force created by the one or more magnets 110 reduces the weight load of the turbine rotor 104 on the turbine support 106, as will be discussed in more detail below.

The turbine support 106 may be any suitable shape capable of supporting the weight of the turbine rotor 104 and stabilizing the turbine rotor 104 as it rotates about the axis 102. The turbine support 106, as shown in FIG. 1A, includes a base 120 and the support shaft 118. The base 120 may rest under the bottom 116 of the turbine rotor 104. The base 120 typically acts as a support between a surface 124, such as the ground or bed rock, and the turbine rotor 104. The base 120 may include a platform 122 adjacent the turbine rotor 104 and a bottom member 123 adjacent the surface 124. The base 120 may be any suitable shape so long as the base is capable of supporting the weight of the turbine rotor 104.

Figure 3:
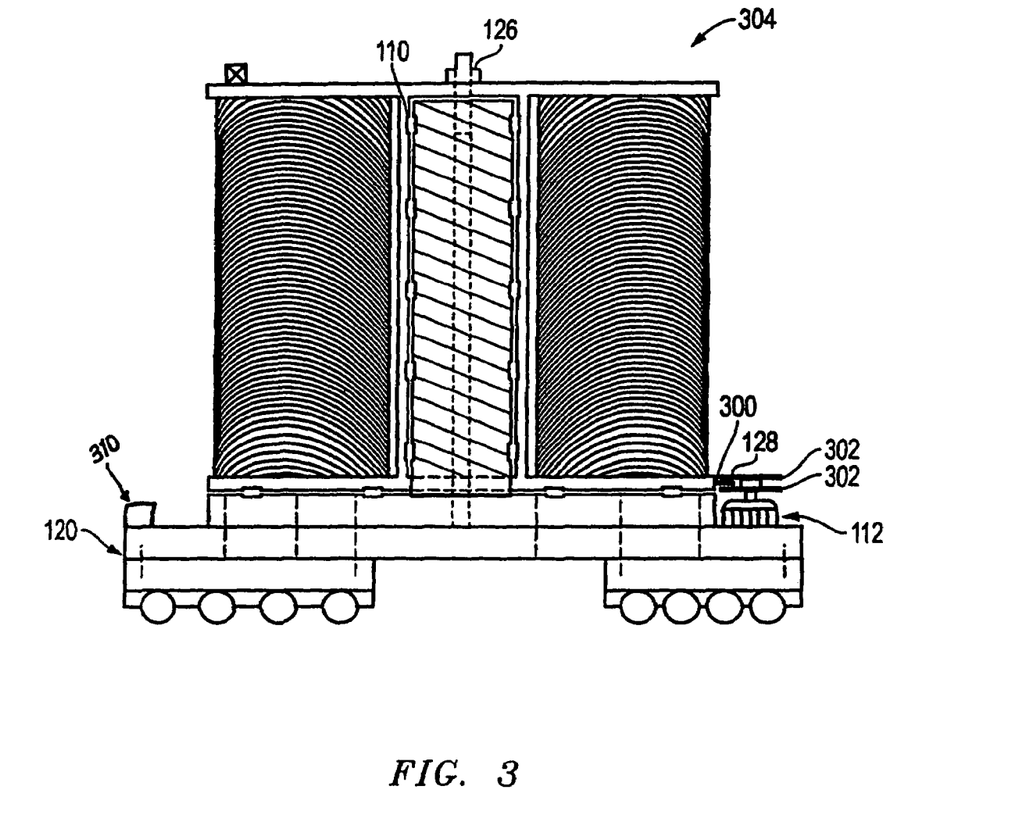
FIG. 3 is a schematic side view of a wind turbine according to one embodiment.

The surface 124, as shown in FIG. 1A, is the ground; however, it should be appreciated that the surface 124 may be any suitable surface for supporting the base 120 including, but not limited to, a trailer, a boat, a rail car as illustrated in FIG. 3, a top of a building, a top of a parking garage, a top of a stadium, offshore platforms, islands (man-made or otherwise) and the like.

The platform 122 typically provides the support for the weight of the turbine rotor 104. The platform 122 may include one or more magnets 110B which provide an opposing force against the one or more magnets 110A located on the bottom 116 of the turbine rotor 104, as will be described in more detail below. The base 120 and/or the platform 122 may extend the same radial distance from the axis 102 as the turbine rotor 104. Alternatively, the base 120 may extend a shorter radial distance from the axis 102 than the turbine rotor 104, or, in another alternative embodiment, may extend a longer radial distance from the axis 102 than the turbine rotor 104. It should be appreciated that the platform 122 may be any suitable shape capable of providing a vertical support surface for the turbine rotor 104.

The support shaft 118 of the turbine support 106 may provide for stabilization of the turbine rotor 104. The support shaft 118, as shown in FIGS. 1A and 1B is located radially inside the central axis 113 of the turbine rotor 104. FIG. 1A shows the support shaft 118 as a substantially solid shaft which is slightly smaller than the interior of the central axis 113 of the turbine rotor 104. Alternatively, as shown in FIG. 2, the support shaft 118 may define an opening that allows for an interior access way 202. The support shaft 118 allows the turbine rotor 104 to rotate in response to the wind while preventing the turbine rotor 104 from moving substantially in the direction perpendicular to the core axis 102. The support shaft 118 may include one or more magnets 110C which provide an opposing force against one or more magnets 110D located on the central axis 113 of the turbine rotor 104. The magnet 110C located on the support shaft 118 may act to stabilize the turbine rotor as will be discussed in more detail below.

The wind turbine 100 may include a connector 126, shown schematically in FIGS. 1A and 3. The connector 126 may secure the turbine rotor 104 to the turbine support 106 while allowing the turbine rotor 104 to rotate. FIG. 1A shows the connector 126 as a pin type connection which is secured to the support shaft 118 and penetrates an opening in the top 114 of the turbine rotor 104. A head of the pin may rest on the top 114 of the turbine rotor 104. The opening may be large enough to not engage the pin as the turbine rotor 104 rotates about the turbine support 106. The head may simply provide an upward travel limit for the turbine rotor 104. Thus, typically the turbine rotor 104 may not engage the connector 126; however, in the event that the turbine rotor 104 lifts off of the turbine support 106, the head will stop it from becoming detached from the wind turbine 100. It should be appreciated that any suitable arrangement for securing the turbine rotor 104 to the turbine support 106 may be used.

The one or more sets of magnets 110C, 110D reduce friction between the turbine support 106 and the turbine rotor 104 by creating a space between the turbine support 106 and the turbine rotor 104 due to the opposing forces of the magnets. The magnets replace the role of roller bearings in prior wind turbines. The one or more magnets 110A, 110B positioned on the bottom 116 of the turbine rotor 104 and the platform 122 of the turbine support may include one or more levitation magnets and one or more stabilization magnets. The levitation magnets supply an opposing force between the bottom 116 of the turbine rotor 104 and the platform 122. The opposing force created by the levitation magnets may create a force on the turbine rotor 104 substantially opposite to a gravitational force on the turbine rotor 104. The levitation magnets can provide a large enough opposing force to lift the turbine rotor 104 off of the platform 122 thereby eliminating friction between the platform 122 and the turbine rotor 104. Specifically, a space may be created between the platform 122 and the bottom 116 of the turbine rotor 104 as a result of the opposing force. Alternatively, the opposing force created by the levitation magnets may only negate a portion of the gravitational force, so that the friction force between the platform 122 and the turbine rotor 104 is reduced.

The stabilization magnets 110D, 110C, as shown in FIG. 1A, are designed to provide an opposing force between the central axis 113 and the support shaft 118. The stabilization magnets may be located directly on the interior of the central axis 113 and the exterior of the support shaft 118. The stabilization magnets may maintain a space between the inner diameter of the central axis 113 and the outer diameter of the support shaft 118. Therefore, during rotation of the turbine rotor 104 there may be no friction between the central axis 113 of the turbine rotor 104 and the support shaft 118. It should be appreciated that other means of reducing the friction between central axis 113 and the support shaft 118 may be used including, but not limited to, a bearing.

Friction may be eliminated between the turbine rotor 104 and the turbine support 106 using both the levitation magnets and stabilization magnets. The one or more sets of magnets 110 may be any magnets suitable for creating an opposing force including but not limited to a permanent magnet, an electromagnet, permanent rare earth magnet, ferromagnetic materials, permanent magnet materials, magnet wires and the like. A permanent rare earth magnet may include samarium cobalt (SmCo) and/or neodymium (NdFEB). Further, the one or more magnets 110 may be arranged in any suitable manner so long as they reduce the friction between the turbine rotor 104 and the turbine support 106. FIGS. 1A, 2, and 3 show the one or more sets of magnets 110 as a series of permanent magnets spaced apart from one another; however, it should be appreciated that an electromagnet may be used in order to magnetize a portion of the turbine rotor 104 and the turbine support 106. Further, in an alternative embodiment, a portion of the turbine rotor 104 and the turbine support 106 may be magnetized to provide the opposing force. Thus in an alternative embodiment, the entire platform 122 and/or base 120 may be magnetized to provide an opposing force on the bottom 116 of the turbine rotor 104 which may also be magnetized.

The blades 108 may be any suitable blade capable of converting the kinetic energy of the wind into mechanical energy. In one embodiment, the blades 108 are made from a thin metal material, however, it should be appreciated that blades may be any suitable material including, but not limited to, a polycarbon, a fabric, a synthetic material.

The blades 108 may be fixed to the turbine rotor 104 in a static position. Alternatively, the blades 108 may be moveably attached to the turbine rotor 104. For example, a connection between the blades 108 and the turbine rotor 104 may allow the angle of the blades 108 to adjust in relation to the turbine rotor 104. The angle may adjust manually or automatically in response to the wind conditions at the location.

The turbine rotor 104 provides mechanical energy for the one or more generators 112 as the turbine rotor 104 rotates about the axis 102. In one embodiment, a generator gear 128 is moved by a portion of the turbine rotor 104 as the turbine rotor 104 rotates. As shown in FIG. 1A, an outer edge 130 of the gear 128 may be proximate an edge of the turbine rotor 104. In one embodiment, the gear 128 engages the turbine rotor 104 with a traditional gear and/or transmission device capable of transferring rotation to the gear 128.

In an additional or alternative embodiment, the gear 128 may be a magnetic gear. The magnetic gear is a gear that moves in response to a magnetic force between the turbine rotor 104 and the magnetic gear. At least one of the gear 128 and/or the proximate portion of the turbine rotor 104 may be magnetized. Thus, as the turbine rotor 104 rotates proximate the gear 128 the magnetic force moves the gear 128 in response to the turbine rotor 104 rotation. The magnetic gear allows the turbine rotor 104 to rotate the gear 128 without any friction between the two components.

FIG. 3 shows the magnetic gear according to one embodiment. A rotor gear component 300 may protrude from the outer surface of the turbine rotor 104. The rotor gear component 300 may extend beyond the outer diameter of the turbine rotor 103 and rotate with the turbine rotor 104. As shown, the rotor gear component 300 is a plate extending around an outer diameter of the turbine rotor 104; however, it should be appreciated that any suitable configuration for the rotor gear component 300 may be used. The gear 128 may include one or more gear wheels 302 which extend from the gear to a location proximate the rotor gear component 300. As shown in FIG. 3, there are two gear wheels 302 which are located above and below a portion of the rotor gear component 300. As the turbine rotor 104 rotates, the rotor gear component 300 rotates. A portion of the rotor gear component 300 may pass in between two portions of one or more gear wheels 302. Any of the rotor gear component 300, and the one or more gear wheels 302 may be magnetized. The type of magnet used to produce the magnetic force for the magnetic gear may be any magnet described herein. The magnetic force between the components of the magnetic gear move the gear 128 thereby generating electricity and/or power in the generator 112.

The generators 112 may be located at various locations proximate the turbine rotor 104. FIG. 1B shows three generators 112 located around the perimeter of the turbine rotor 104. It should be appreciated that any suitable number of generators 112 may be used around the perimeter of the turbine rotor 104. Further, the generator 112 may be located at other locations proximate the turbine rotor including, but not limited to, proximate the shaft 102 of the turbine rotor, in line with the axis 102 above and/or below the turbine rotor 104, and the like.

The generator 112 may be any suitable generator for converting mechanical energy into power including, but not limited to, electric generators, motors, linear generators, and the like.

In one embodiment, one or more of the generators 112 is a linear synchronous motor (LSM). The LSM motor may advance the turbine support 120 and may double as a braking system.

The power generated by the generator may be fed directly to a power grid. Further, it should be appreciated that the power may alternatively or additionally be used on site or stored. The stored power may be used at a later date when demand for the power is higher. Examples of power storage units include, but are not limited to, batteries and generating stored compressed air, a flywheel system, a magnetically levitated flywheel system, hydraulic accumulators, capacitors, super capacitors, a combination thereof, and the like.

The one or more magnets 110 reduce and potentially eliminate friction between the turbine rotor 104 and the turbine support 106. This friction reduction allows the scale of the wind turbine 100 to be much larger than a conventional wind turbine. In a conventional wind turbine the larger the wind turbine, the more friction is created between the moving parts. The amount of friction eventually limits the effective size of a conventional wind turbine. In one example, the wind turbine may have an outer diameter of 1000 ft. Known wind turbines prior to this invention typically have diameters of up to approximately 300 ft. In a preferred embodiment, a fixed wind turbine 200, as shown in FIG. 2, has an outer diameter of about 600 ft. and is capable of producing more than 1 GWh of power. A smaller portable wind turbine 304, shown in FIG. 3, may be adapted to transport to remote locations. The portable version may have a diameter of greater than 15 ft. and a height of greater than 15 ft. In a preferred embodiment, the portable version has an outer diameter within a range of about 30 ft. to 120 ft. and a height within a range of about 25 ft. to 100 ft. and is capable of producing 50 MWh of power. It should be appreciated that the size and scale of the wind turbine may vary depending on a customers need. Further, it should be appreciated that more than one wind turbine may be located on the same portable transports system, and/or at one fixed location.

Although, the overall size of the wind turbine 100 may be much larger than a traditional wind turbine, the amount of power one wind turbine 100 produces is much larger than a traditional wind turbine. Therefore, the total land use required for the wind turbine 100 may be reduced over that required for a traditional wind farm.

The embodiment shown in FIG. 2 shows the fixed wind turbine 200, according to one embodiment. The fixed wind turbine 200 may have a turbine support 106 which extends over the turbine rotor 104. The one or more magnets 110 may be on an upper portion 201 of the turbine support 106 in addition to the locations described above.

The fixed wind turbine 200 may include an interior access way 202, according to one embodiment. It should be appreciated that any of the wind turbines 100, 200 and 304 may include an interior access way 202. The interior access way 202 allows a person to access the interior of the turbine support 104. The interior access way 202 may extend above and/or below the turbine rotor 104 in order to give the person access to various locations in the fixed wind turbine 200. The interior access way 202 may allow a person to perform maintenance on the magnets 110 and other components of the wind turbine 100, 200, and 304. Further, the interior access way 202 may have a means for transporting persons up and down the interior access way 202. The means for transporting persons may be any suitable item including, but not limited to, an elevator, a cable elevator, a hydraulic elevator, a magnetic elevator, a stair, a spiral staircase, an escalator, a ladder, a rope, a fireman pole, a spiral elevator, and the like. The spiral elevator is an elevator that transports one or more persons up and down the interior access way 202 in a spiral fashion around the interior of the interior access way 202. For example, the spiral elevator may travel in a similar path to a spiral staircase. The elevator and/or spiral elevator may use magnetic levitation to lift the elevator up and down.

The upper portion 201 of the turbine support 106 may include an observation deck 204. The observation deck 204 may extend around the perimeter of the wind turbine 100, 200 and/or 304, thereby allowing a person to view the surrounding area from the observation deck 204. The observation deck 204 may also serve as a location for an operator to control various features of the wind turbine, as will be discussed in more detail below.

The upper portion 201 of the turbine support 106 may further include a helipad 206. The helipad 202 allows persons to fly to the wind turbine 100, 200, and/or 304 and land a helicopter (not shown) directly on the wind turbine. This may be particularly useful in remote locations, or locations with limited access including, but not limited to, the ocean, a lake, a industrial area, a tundra, a desert, and the like.

The upper portion 201 of the turbine support 106 may further have one or more cranes 208. The cranes 208 allow an operator to lift heavy equipment. The crane 208 may be a tandem crane capable of rotating around the diameter of the wind turbine. The crane may assist in the construction of the wind turbine 100.

Figure 4:
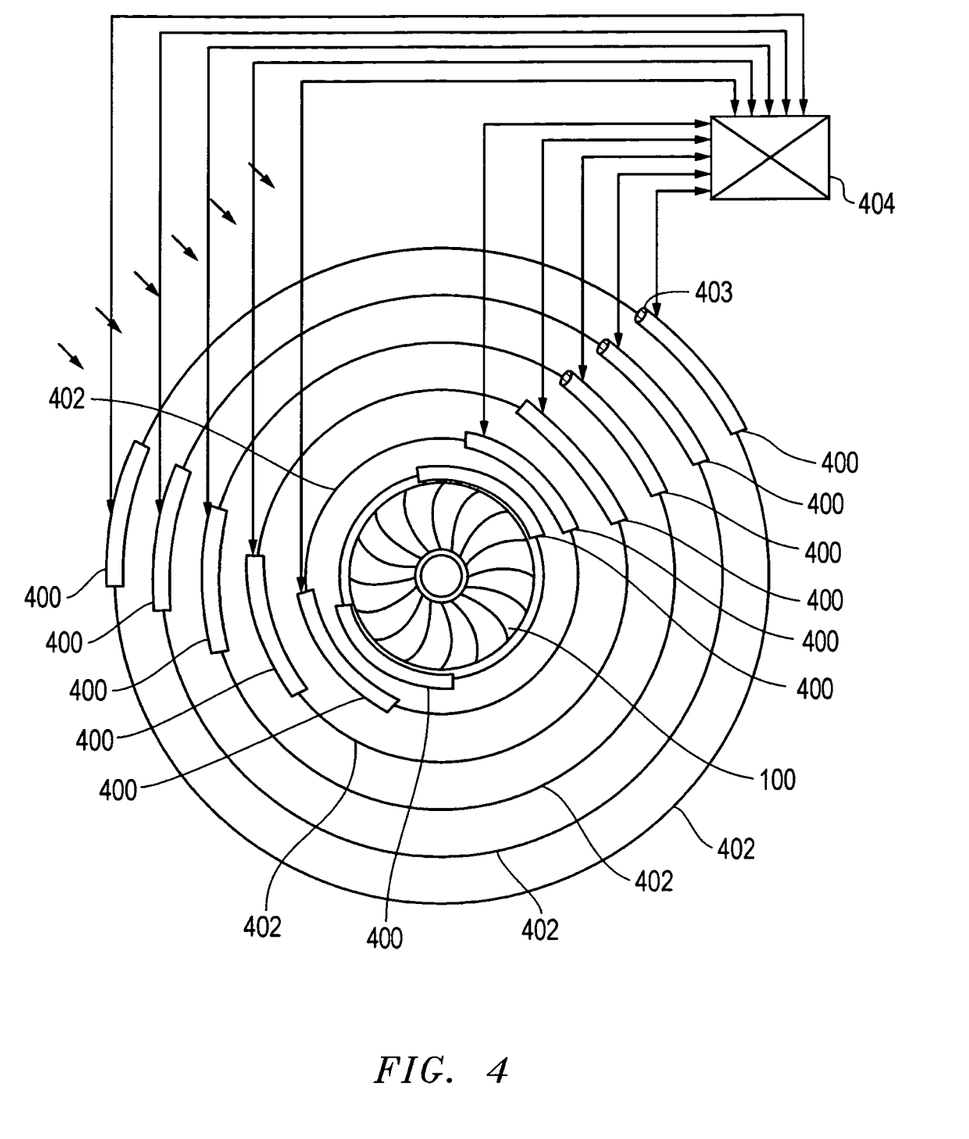
FIG. 4 is a schematic top view of a wind turbine according to one embodiment.

FIG. 4 shows a top view of the wind turbine 100 in conjunction with one or more wind compressors 400. The wind compressors 400 are each an obstruction configured to channel the wind toward the wind turbine 100, creating a venturi effect as the winds converge toward the wind turbine 100. This venturi effect on the wind turbines increases the rpms or rotation speed of the rotors which translates into increased electrical energy produced by the generators 112 (FIG. 1A). This increase in wind energy and force upon the turbine blades 108 is thus translated from the wind turbine 100 to the generator 112 resulting in an increased output of electricity. This invention 400 increases the efficiency and ultimate output of the wind turbine 100 up to or beyond 1000-2000 megawatts per hour (MWh) or 1 gigawatt per hour (GWh). Known wind turbines produce between 2-4 MGW/hour.

The wind compressor 400 may be any suitable obstruction capable of re-channeling the natural flow of wind towards the wind turbines 100, 400. Suitable wind compressors include, but are not limited to, a sail, a railroad car, a trailer truck body, a structure, and the like. Structurally the obstructions comprises a shape and size to capture and redirect a body of wind towards the wind turbine. In one embodiment an obstruction such as a sail, which comprises a large area in two dimensions but is basically a flat object, must be anchored to avoid displacement by the force of the wind. Other obstructions, such as the rail road car or trailer truck, should have enough weight to avoid wind displacement.

Each of the wind compressors 400 may be moveably coupled to a transporter 403, or transport device to move the compressor 400 to a location or position that captures the wind flow as the direction of wind changes and directs the wind flow towards the wind turbine. The transporter may be any suitable transporter 403 capable of moving the wind compressor 400 including, but not limited to, a locomotive to move a rail car, a automobile, a truck, a trailer, a boat, a Sino trailer, a heavy duty self propelled modular transporter 403 and the like. Each of the transporters 403 may include an engine or motor capable of propelling the transporter 403. The location of each of the wind compressors 400 may be adjusted to suit the prevailing wind pattern at a particular location. Further, the location of the wind compressors 400 may be automatically and/or manually changed to suit shifts in the wind direction. To that end, the transporter 403 may include a drive member for moving the transporter 403. The transporter 403 may be in communication with a controller, for manipulating the location of each of the transporters 403 in response to the wind direction. A separate controller may be located within each of the transporters 403.

One or more pathways 402, shown in FIG. 4, may guide transporters 403 as they carry the wind compressors 400 to a new location around the wind turbine 100. The one or more pathways 402 may be any suitable pathway for guiding the transporters including, but not limited to, a railroad, a monorail, a roadway, a waterway, and the like. As shown in FIG. 4, the one or more pathways 402 are a series of increasingly larger circles which extend around the entire wind turbine 100. It should be appreciated that any suitable configuration for the pathways 402 may be used. As described above, the size of the wind turbine 100 may be greatly increased due to the minimized friction between the turbine rotor 104 and the turbine support 106. Thus, the pathways 402 may encompass a large area around the wind turbine 100. The wind compressors 400 as a group may extend out any distance from the wind turbine 100, only limited by the land use in the area. Thus, a large area of wind may be channeled directly toward the wind turbine 100 thereby increasing the amount of wind engaging the blades 108.

In one aspect of this invention, the controller may be a single controller 404 capable of controlling each of the transporters 403 from an onsite or remote location. The controller(s) 404 may be in wired or wireless communication with the transporters 403. The controller(s) 404 may initiate an actuator thereby controlling the engine, motor or drive member of the transporter 403. The controller(s) may comprise a central processing unit (CPU), support circuits and memory. The CPU may comprise a general processing computer, microprocessor, or digital signal processor of a type that is used for signal processing. The support circuits may comprise well known circuits such as cache, clock circuits, power supplies, input/output circuits, and the like. The memory may comprise read only memory, random access memory, disk drive memory, removable storage and other forms of digital memory in various combinations. The memory stores control software and signal processing software. The control software is generally used to provide control of the systems of the wind turbine including the location of the transporters 403, the blade direction, the amount of power being stored versus sent to the power grid, and the like. The processor may be capable of calculating the optimal location of each of the wind compressors based on data from the sensors.

One or more sensors 310, shown in FIG. 3, may be located on the wind turbines 100, 200 and/or 304 and/or in the area surrounding the wind turbines. The sensors 310 may detect the current wind direction and/or strength and send the information to a controller 312. The sensors 310 may also detect the speed of rotation of the turbine rotor 104. The controller 312 may receive information regarding any of the components and/or sensors associated with the wind turbines. The controller 312 may then send instructions to various components of the wind turbines, the wind compressors and/or the generators in order to optimize the efficiency of the wind turbines. The controller 312 may be located inside the base of the tower, at the concrete foundation, a remote location, or in the control room at the top of the tower.

It should be appreciated that the wind compressors may be used in conjunction with any number and type of wind turbine, or wind farms. For example, the wind compressors 400 may be used with one or more horizontal wind turbines, traditional vertical wind turbines, the wind turbines described herein and any combination thereof.

Preferred methods and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

The invention claimed is:

1. A wind turbine, comprising:
a vertical turbine rotor for rotating around a core axis, the turbine rotor comprising a central axis;
turbine support comprising a vertical stationary support shaft within and concentric to the turbine rotor and in relation to the support shaft, the support shaft positioned radially inside the central axis;
one or more blades coupled to the turbine rotor, the one or more blades configured to capture wind energy to rotate the turbine rotor relative to the turbine support;
stabilization magnet means comprising one or more turbine support magnets positioned along a side of the turbine support adjacent the turbine rotor and one or more turbine rotor magnets positioned along a side of the central axis adjacent the turbine support and opposing the turbine support magnets,
wherein a repelling force generated between the turbine support magnets and the turbine rotor magnets creates a space between at least a portion of the turbine rotor and at least a portion of the turbine support;

levitation magnet means positioned along an upper portion of a platform of said turbine support adjacent a lower portion of the turbine rotor, and positioned along a lower portion of said turbine rotor adjacent said platform of said turbine support, creating a space between said turbine support and said turbine rotor due to magnetic repulsion, whereby said turbine rotor levitates off said platform; and one or more generators configured to generate electric power in response to rotation of the turbine rotor relative to the turbine support.

2. The wind turbine of claim 1, wherein the turbine support further comprises a base.

3. The wind turbine of claim 2, wherein the base further comprises a platform located substantially under a bottom of the turbine rotor.

4. The wind turbine of claim 3, wherein said levitation magnet means comprises:
one or more turbine support levitation magnets positioned along the platform of the turbine support, and
one or more turbine rotor levitation magnets positioned along the bottom of the turbine rotor and opposing the turbine support levitation magnets,
wherein a magnetic field generated between the turbine support levitation magnets and the turbine rotor levitation magnets creates a space between at least a portion of the platform of the turbine support and at least a portion the bottom of the turbine rotor.

5. The wind turbine of claim 1, wherein the one or more generators further comprises:
a generator gear; and
a turbine gear, wherein the turbine gear is configured to move the generator gear.

6. The wind turbine of claim 5, further comprising a magnetic gear connection between the generator gear and the turbine gear, wherein the magnetic gear connection is configured to move the generator gear while reducing friction between the turbine gear and the generator gear.

7. The turbine of claim 1, wherein the turbine rotor further comprises:
a bottom; and
a top, wherein the bottom and the top extend substantially radially away from the central axis.

8. The wind turbine of claim 7, wherein the one or more blades further comprise a poly-carbon material and extend substantially between the top and the bottom of the turbine rotor.

9. The wind turbine of claim 1, wherein the turbine support further comprises:
a base located below the turbine rotor; and
a top configured to cover a substantial portion of the turbine rotor and the one or more blades.

10. The wind turbine of claim 9, wherein the top further comprises an observation deck for one or more persons to access.

11. The wind turbine of claim 9, wherein the support shaft further comprises an interior access way configured to allow the one or more persons to travel to and from the observation deck.

12. The wind turbine of claim 11, wherein the interior access way further comprises an elevator.

13. The wind turbine of claim 1, wherein at least one of the magnets is a permanent magnet.

14. A method for generating electricity by a wind turbine, the method comprising:
spacing a vertical turbine rotor comprising one or more blades coupled thereto from a turbine support comprising a vertical stationary support shaft, the support shaft disposed radially within and concentric to a central axis of the turbine rotor, the central axis rotating with the turbine rotor and in relation to the support shaft;
positioning one or more turbine support magnets along a side of the turbine support adjacent the turbine rotor;
positioning one or more turbine rotor magnets along a side of the central axis adjacent the turbine support so as to oppose the turbine support magnets;
maintaining the turbine rotor spaced from the turbine support using a repelling force between the turbine support magnets and the turbine rotor magnets, thereby reducing friction between the vertical turbine rotor and the turbine support;
causing the one or more blades to engage wind thereby rotating the turbine rotor relative to the turbine support; and
converting the mechanical energy of the moving vertical turbine rotor into electric power using a generator.

15. The method of claim 14, further comprising:
rotating a turbine gear mechanically coupled to the vertical turbine rotor proximate a generator gear mechanically coupled to the generator; and
rotating the generator gear.

16. The method of claim 15, wherein moving the generator gear further comprises engaging the generator gear with a magnetic force between the turbine gear and the generator gear.

17. A method for generating electricity by a wind turbine, comprising:
attaching one or more turbine rotor magnets to a turbine rotor;
attaching one or more turbine support magnets to a turbine support so as to oppose the turbine rotor magnets, wherein opposing magnetic forces between the turbine rotor magnets and the turbine support magnets create a space between the turbine support and the turbine rotor thereby reducing friction between the turbine rotor and the turbine support;
rotating the turbine rotor using the wind force captured by the turbine rotor; and
converting mechanical energy of the rotating turbine rotor into electric power using a generator.

18. The method of claim 17, further comprising rotating a generator gear using a magnetic force between a turbine gear and the generator gear.

19. A vertical wind turbine, comprising:
a turbine rotor, the turbine rotor comprising:
a central axis;
a top; and
a bottom, wherein the top and the bottom extend radially away from the central axis;
a turbine support, the turbine support comprising:
a vertical stationary support shaft disposed radially within and concentric to the central axis of the turbine rotor, the central axis rotating with the turbine rotor and in relation to the support shaft; and
a base, the base further comprising a platform located substantially under the bottom of the turbine rotor;
one or more turbine support magnets located along an exterior of the support shaft;
one or more turbine rotor magnets located along an interior of the central axis, a repelling force between the turbine support magnets and the turbine rotor magnets creating a space between the support shaft and the central axis;
turbine support levitation magnets located along the platform of the turbine support;

one or more turbine rotor levitation magnets located along the bottom of the turbine rotor, the turbine support levitation magnets and the turbine rotor levitation magnets together generating a magnetic field that maintains the turbine rotor space from the platform, thereby reducing friction between the turbine rotor and the turbine support;

one or more blades coupled to the turbine rotor, the one or more blades adapted to capture wind energy to rotate the turbine rotor relative to the turbine support; and a generator connected to the turbine rotor to convert mechanical power of the moving turbine rotor into electric power.

20. The wind turbine of claim 4, wherein the magnetic field is generated between the entire turbine rotor and the entire turbine support.

\* \* \* \* \*